United States Patent
Briese

(10) Patent No.: US 11,864,639 B2
(45) Date of Patent: Jan. 9, 2024

(54) REFLECTOR UMBRELLA WITH GATHERED REFLECTIVE ELEMENT, AND REFLECTOR ASSEMBLY COMPRISING SUCH A REFLECTOR UMBRELLA

(71) Applicant: Hans-Werner Friedrich Briese, Hamburg (DE)

(72) Inventor: Hans-Werner Friedrich Briese, Hamburg (DE)

(*) Notice: Subject to any disclaimer, the term of this patent is extended or adjusted under 35 U.S.C. 154(b) by 0 days.

(21) Appl. No.: 17/786,709

(22) PCT Filed: Dec. 15, 2020

(86) PCT No.: PCT/EP2020/086125
§ 371 (c)(1),
(2) Date: Jun. 17, 2022

(87) PCT Pub. No.: WO2021/122532
PCT Pub. Date: Jun. 24, 2021

(65) Prior Publication Data
US 2023/0016559 A1    Jan. 19, 2023

(30) Foreign Application Priority Data
Dec. 20, 2019   (DE) .................. 102019135536.2

(51) Int. Cl.
*A45B 23/00*    (2006.01)
*F21V 7/18*    (2006.01)
(Continued)

(52) U.S. Cl.
CPC ................ *A45B 23/00* (2013.01); *F21V 7/18* (2013.01); *A45B 19/10* (2013.01); *F21V 1/06* (2013.01);
(Continued)

(58) Field of Classification Search
CPC .. F21V 7/18; F21V 1/06; G03B 15/02; G03B 15/06; G03B 15/07; A45B 19/10
See application file for complete search history.

(56) References Cited

U.S. PATENT DOCUMENTS

D622,440  S  *  8/2010  Briese .................. D26/118
8,147,079  B2     4/2012  Briese
(Continued)

FOREIGN PATENT DOCUMENTS

CN        101224793 A      7/2008
EP         2535639 A1    12/2012
(Continued)

OTHER PUBLICATIONS

Machine translation of KR 101790469 B1 retrieved from the FIT database of PE2E search. (Year: 2023).*
(Continued)

*Primary Examiner* — Colin J Cattanach
(74) *Attorney, Agent, or Firm* — Dinsmore & Shohl LLP

(57) ABSTRACT

A foldable reflector umbrella has a flexible, cloth-like reflective element with an outer supporting and tensioning structure composed of a plurality of tensioning spokes which are preferably distributed evenly over the expanse and divide the reflective element into a number of umbrella segments essentially corresponding to the number of tensioning spokes. With the reflector umbrella in the opened state, the reflective element consisting of the number of umbrella segments forms a substantially rotationally symmetrical body with a light exit opening. The reflector umbrella has a cloth-like reflective element in the opened state that is at least partially gathered so as to form an uneven reflection surface. A reflector assembly including a reflector umbrella is also provided.

14 Claims, 5 Drawing Sheets

(51) Int. Cl.
*F21V 1/06* (2006.01)
*G03B 15/06* (2021.01)
*A45B 19/10* (2006.01)
*G03B 15/07* (2021.01)
*G03B 15/02* (2021.01)

(52) U.S. Cl.
CPC ............. *G03B 15/02* (2013.01); *G03B 15/06* (2013.01); *G03B 15/07* (2013.01)

(56) References Cited

U.S. PATENT DOCUMENTS

| | | | |
|---|---|---|---|
| 2002/0075666 A1 | 6/2002 | Shirilla et al. | |
| 2004/0057244 A1 | 3/2004 | Amano | |
| 2010/0177520 A1* | 7/2010 | Briese | G02B 5/10 |
| | | | 362/347 |
| 2010/0188752 A1 | 7/2010 | Briese | |
| 2010/0265691 A1* | 10/2010 | Ortiz-Gavin | G02B 5/09 |
| | | | 359/853 |
| 2014/0033758 A1 | 2/2014 | Visin | |
| 2014/0071697 A1* | 3/2014 | Portmann | F21V 7/18 |
| | | | 362/319 |
| 2017/0248834 A1* | 8/2017 | Ortiz-Gavin | G03B 15/06 |

FOREIGN PATENT DOCUMENTS

| | | | | |
|---|---|---|---|---|
| EP | 2171545 B1 | 12/2018 | | |
| KR | 101790469 B1 * | 10/2017 | ............. | A45B 25/02 |
| WO | 2019097048 A1 | 5/2019 | | |

OTHER PUBLICATIONS

International Search Report dated Mar. 19, 2021; International Application PCT/EP2020/086125.

* cited by examiner

REFLECTOR UMBRELLA WITH GATHERED REFLECTIVE ELEMENT, AND REFLECTOR ASSEMBLY COMPRISING SUCH A REFLECTOR UMBRELLA

CROSS-REFERENCE TO RELATED APPLICATIONS

This application is the U.S. National Stage of PCT/EP2020/086125 filed on Dec. 15, 2020, which claims priority to German Patent Application 102019135536.2 filed on Dec. 20, 2019, the entire content of both are incorporated herein by reference in their entirety.

FIELD OF THE INVENTION

The invention relates to a foldable reflector umbrella comprising a flexible, cloth-like reflective element with an outer supporting and tensioning structure composed of a plurality of tensioning spokes which are preferably distributed evenly over the expanse and divide the reflective element into a number of umbrella segments essentially corresponding to the number of tensioning spokes, wherein, with the reflector umbrella in the opened state, the reflective element consisting of the number of umbrella segments forms a substantially rotationally symmetrical body with a light exit opening.

The invention further relates to a reflector assembly comprising a reflector umbrella and a carrier element with at least one light source.

BACKGROUND OF THE INVENTION

Such reflector umbrellas and reflector assemblies are used in particular in the field of photography and/or film. Especially in the field of photography and film, reflector umbrellas must be easy to handle for the purposes of transport and set-up on the photo/film set, which is why mobile reflector umbrellas on the one hand are lightweight and on the other hand have a small volume when folded, so that reflector umbrellas are only opened to their full size and final shape in the place of use. The reflector umbrella holds itself in the final, opened shape without additional aids by means of the self-contained supporting and tensioning structure, which is based, for example, on the toggle link principle. When the reflector umbrella is in its final, opened shape, it is a rotationally symmetrical body with a conical shape in the broadest sense. Starting from an imaginary vertex of the rotationally symmetrical body, the tensioning spokes run uniformly and radially towards the light exit opening. The tensioning spokes are preferably equally spaced over the expanse. Each umbrella segment is disposed between two tensioning spokes and likewise extends from the imaginary vertex to the light exit opening and becomes wider towards the light exit opening.

In a section containing the axis of rotation of the reflector umbrella, the rotationally symmetrical body has, for example, the shape of an ellipse and/or a parabola and/or a circle and/or a hyperbola. The cross-section can be the same starting from the vertex and going towards the light exit opening. However, the cross-section can also vary, for example in such a way that a section of the reflective element that is elliptical in section lies behind a section of the reflective element that is parabolic in section, starting from the vertex and going towards the light exit opening. Other cross-sectional shapes and combinations of cross-sectional shapes are however also common for reflector umbrellas.

Preferably different light and/or shadow effects and images, that is to say, different image characteristics can be created or designed by means of reflector umbrellas in conjunction with light sources. The light emitted by the or each light source strikes the reflective element and is reflected by it. The cloth-like reflective element has an outer surface, and an inner surface that produces the reflection. The outer surface can be of almost any shape and design. The inner surface has a reflective layer forming the reflective surface of the reflector umbrella. The cloth-like reflective element is tensioned by the supporting and tensioning structure, therefore, despite the curved shape of the reflective element in the opened state, it has an essentially smooth texture, so that the outer surface and the inner surface, thus in particular also the reflective surface, are essentially wrinkle-free. The disadvantage of such reflector umbrellas is that the reflective elements have a strong glare effect due to the highly reflective properties of the reflective surface. Put simply, it is hardly possible to look into a reflector umbrella while it is in use, that is to say, illuminated by at least one light source, without squinting or even closing the eyes. Often, looking into an illuminated reflector umbrella even causes the eyes to water, which is highly undesirable, especially when taking pictures of people.

SUMMARY OF THE INVENTION

The invention is thus based on the task of providing a reflector umbrella with improved reflection and, in particular, glare properties. The task further consists in proposing a corresponding reflector assembly.

This task is solved by a reflector umbrella of the type mentioned hereinbefore in that the cloth-like reflective element is at least partially gathered in the opened state so as to form an uneven reflective surface. The shape of the reflector umbrella as a rotationally symmetrical body with a conical cross-section essentially provides a curved reflective surface. However, the embodiment according to the invention does not refer to the outer shape of the reflective element, but rather to the surfaces of the reflective element itself, which are provided with peaks and troughs due to the gathering. Due to the gathering, the curved, but originally smooth reflective surface is, as it were, broken up or artificially provided with folds or similar, which ensure that the light is scattered with a corresponding diffusion effect. On the one hand, this significantly reduces the glare effect so that persons can look into the reflector umbrella while it is in use without any negative effects, such as blinking or closing or watering of the eyes, which is very important in portrait photography, for example. On the other hand, this embodiment according to the invention generates a (scattered) light that enables optimised image characteristics and avoids sharp shadows and, in particular, allows low-shadow or shadow-free images to be captured.

In a preferred embodiment, at least some of the umbrella segments are at least partially gathered. For example, only every second umbrella segment may be gathered. The umbrella segments may be gathered only in certain portions, for example in the peripheral area of the light exit opening, or they may be fully gathered. Finally, individual umbrella segments can also be provided with different gathering patterns, for example, alternating between slight gathering (to form slight unevenness) and pronounced gathering (to form pronounced unevenness).

In a particularly advantageous further development, each umbrella segment lying between two tensioning spokes is designed to be gathered over essentially the entire surface. This embodiment achieves particularly good and uniform glare reduction, with improved image characteristics at the same time, especially in terms of shadow reduction.

Expediently, means for gathering the reflective element are associated with the or each umbrella segment. These mechanical gathering means can be, for example, staples, clasps, tensioning rubbers, tensioning threads or other components that create a gathering. The gathering means can be an integral part of the reflector umbrella or can be permanently and/or detachably connected to it as separate components.

Preferably, the or each umbrella segment has at least one seam spaced from the tensioning spokes. The or each gathering seam, which is formed in addition to the seams in the area where the outward-lying tensioning spokes are disposed, represents a gathering means that is particularly easy and inexpensive to produce and does not impair the folding function of the reflector umbrella. One or more gathering seams may be provided in each umbrella segment. The gathering seams can vary in their length and orientation, for example, they can run diagonally or across the tensioning spokes or cross each other.

Particularly advantageously, the or each seam in each umbrella segment runs centrally between the tensioning spokes. This means that the gathering seams run from the free edge of the reflector umbrella at the light exit opening towards the imaginary vertex, each at the same distance from the two adjacent seams of the tensioning spokes, the distance of the gathering seam from the adjacent seams of the tensioning spokes decreasing in each case towards the vertex. The gathering seam can run approximately as far as the vertex S. However, the or each gathering seam can also end at a distance from the vertex. The gathering seam can be inserted or sewn into the reflective element. It is also possible for each umbrella segment to be separated centrally between two tensioning spokes and then sewn back together, resulting in a gathered structure due to the shortening of the material of the reflective element.

Advantageously, a hem pocket is formed in the area of each seam, into which at least one gathering spoke is inserted. The hem pocket for each gathering seam is preferably disposed on the outside. The or each gathering spoke may be sewn directly and fully into the hem pocket. However, the hem pocket can also have one or more openings through which the or each gathering spoke can be inserted. On the one hand, the gathering spokes support the supporting and tensioning structure of the reflector umbrella so as to provide a reflector umbrella that is dimensionally stable. On the other hand, the gathering spokes enhance the gathered structure and keep it in shape.

Advantageously, each gathering spoke is made of a flexible material, preferably a glass fibre reinforced plastic. Due to the flexible material of the gathering spokes, on the one hand they are easy to assemble and on the other hand they ensure the dimensional stability of the reflective element and of the gathered structure. Naturally, gathering spokes made of other materials, such as metals, can also be used.

In an optional further development of the gathering spokes, at least portions of each gathering spoke have a textured surface. The surface may be roughened or have protrusions or similar. The textured surface of the gathering spokes can support or even enhance the formation of the gathered structure, especially when the gathering spokes are inserted into the hem pockets, in that the surface texture "hooks" the material/fabric of the reflective element or hem pocket, the material/fabric being pushed together when the gathering spokes are inserted and wrinkles accordingly. The gathering spokes, which are preferably round in cross-section, though other cross-sections are also possible, can also have a smooth surface.

Advantageously, the reflective element consists of a one-piece blank and the umbrella segments are divided by seams, the tensioning spokes being at least partially led through outward-lying hem pockets running along the seams. However, the reflective element can also be formed from a plurality of blanks.

A particularly preferred further development is characterised in that the supporting and tensioning structure comprises twenty-four tensioning spokes which are evenly distributed over the expanse of the opened reflector umbrella to form twenty-four umbrella segments. The twenty-four umbrella segments are preferably divided by gathering seams (with or without gathering spokes) forming gathering means, so as to create forty-eight equal umbrella sub-segments. The number of tensioning spokes can vary. The number of umbrella segments can also vary accordingly.

An advantageous embodiment is characterised in that the cloth-like reflective element consists of a carrier material onto which an aluminium vapour-coated plastic film is applied to an inner side forming the reflective surface. However, other embodiments of the reflective element are also possible, in particular with regard to the choice of carrier material and the formation of the reflective surface.

The task is also solved by a reflector assembly of the type mentioned hereinbefore in that the reflector umbrella is configured and adapted as disclosed herein. The resulting advantages have already been described in connection with the reflector umbrella, therefore reference is made to the relevant passages so as to avoid repetition.

BRIEF DESCRIPTION OF THE DRAWINGS

Further useful and/or advantageous features and further developments of the reflector umbrella and the reflector assembly can be seen disclosed herein. Particularly preferred embodiments are explained in more detail with reference to the attached drawing. The drawing shows the following.

DETAILED DESCRIPTION OF THE INVENTION

Figure 1:
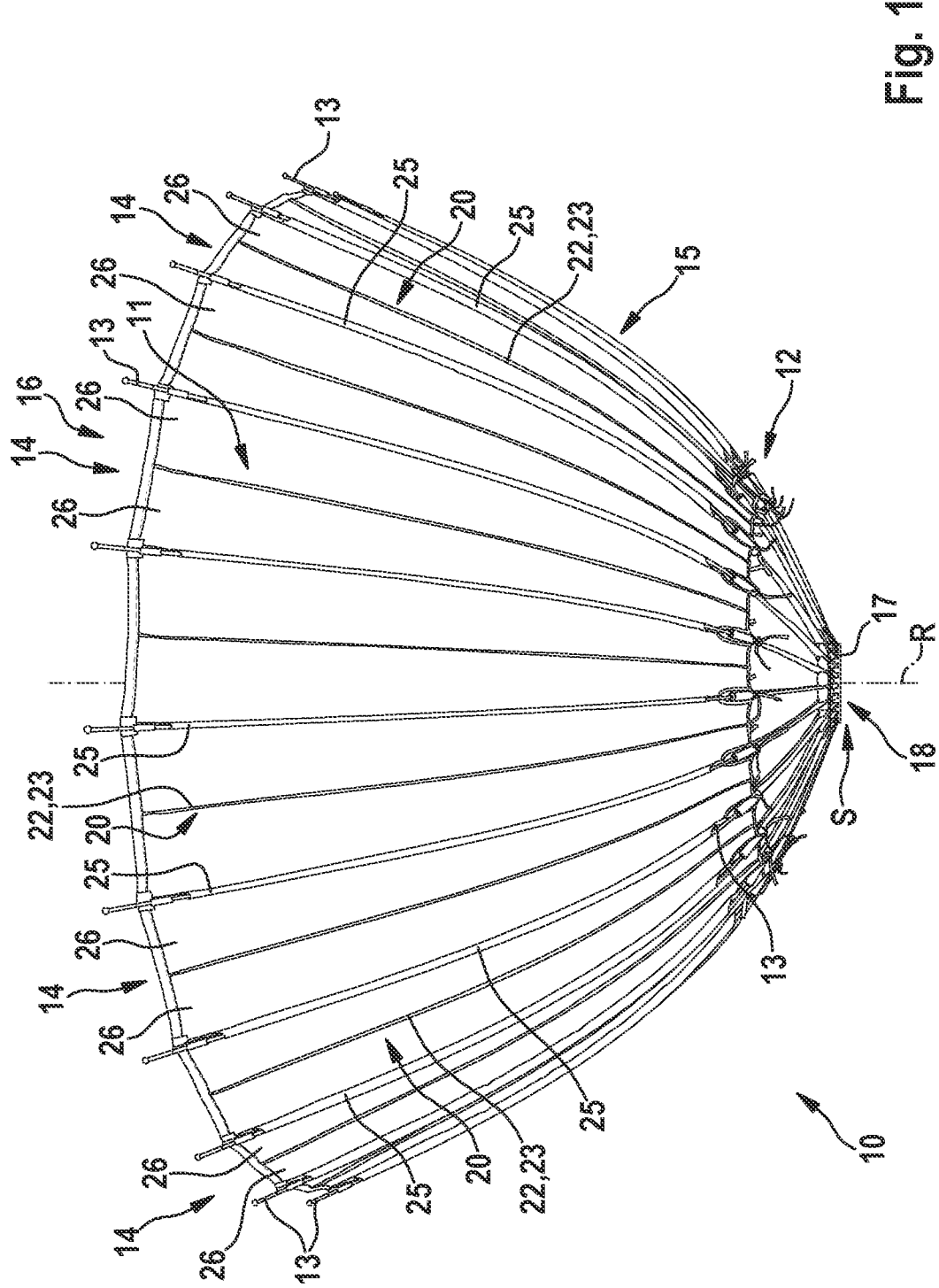
FIG. 1 is a schematic representation of a preferred embodiment of a reflector umbrella according to the invention viewed from the side.

The reflector umbrella shown in the drawing is configured and adapted for use in photography and filming. However, the reflector umbrella can also be used as a simple lampshade and deliver the technical advantages.

The invention relates to a foldable reflector umbrella 10 comprising a flexible, cloth-like reflective element 11 with an outer supporting and tensioning structure 12 composed of a plurality of tensioning spokes 13 which are preferably distributed evenly over the expanse and divide the reflective element 11 into a number of umbrella segments 14 essentially corresponding to the number of tensioning spokes 13, wherein, with the reflector umbrella 10 in the opened state, the reflective element 11 consisting of the number of umbrella segments 14 forms a substantially rotationally symmetrical body 15 with a light exit opening 16. In the opened state, the carrier material for the reflective element 11, consisting of a synthetic material or natural material or a mixture thereof, is held under tension by the tensioning spokes 13 as part of the supporting and tensioning structure 12. The tensioning spokes 13 run from an imaginary vertex S of the opened reflector umbrella 10 towards the light exit opening 16 in a fan-like or radiating fashion. In the area of the vertex S, the tensioning spokes 13 are fixed to a supporting or tensioning ring 17. This supporting or tensioning ring 17 has a through-opening 18, which is configured and adapted for the passage/insertion of a light source, a carrier element or similar (see below). The tensioning spokes 13 can end at the free edge of the light exit opening 14 or project beyond it. The tensioning spokes 13 divide the reflective element 11 into the umbrella segments 14, so that an umbrella segment 14 is always bounded or enclosed by two tensioning spokes 13.

This reflector umbrella 10 according to the invention is characterised in that the cloth-like reflective element 11 is at least partially gathered in the opened state so as to form an uneven reflective surface 19. Ultimately, the partial or complete gathering, that is to say, the creation of an at least partially uneven reflective surface 19, can be achieved without additional means, for example by creating tensions in the reflective element 11 or similar, or by separate means or by means that are an integral part of the reflector umbrella. It is possible for the reflective element 11 to be gathered throughout. In other embodiments, for example in the case of a reflective element 11 having a multi-layered structure, only the inward-facing layer of the reflective element 11 forming the reflective surface 19 may be gathered.

The features and further developments described below represent preferred embodiments of the reflector umbrella 10, either individually or in combination with each other. It is expressly pointed out that features which are summarised in the description and/or the drawing or described in a common embodiment can also functionally and independently further form the reflector umbrella 10 described above.

Figure 2:
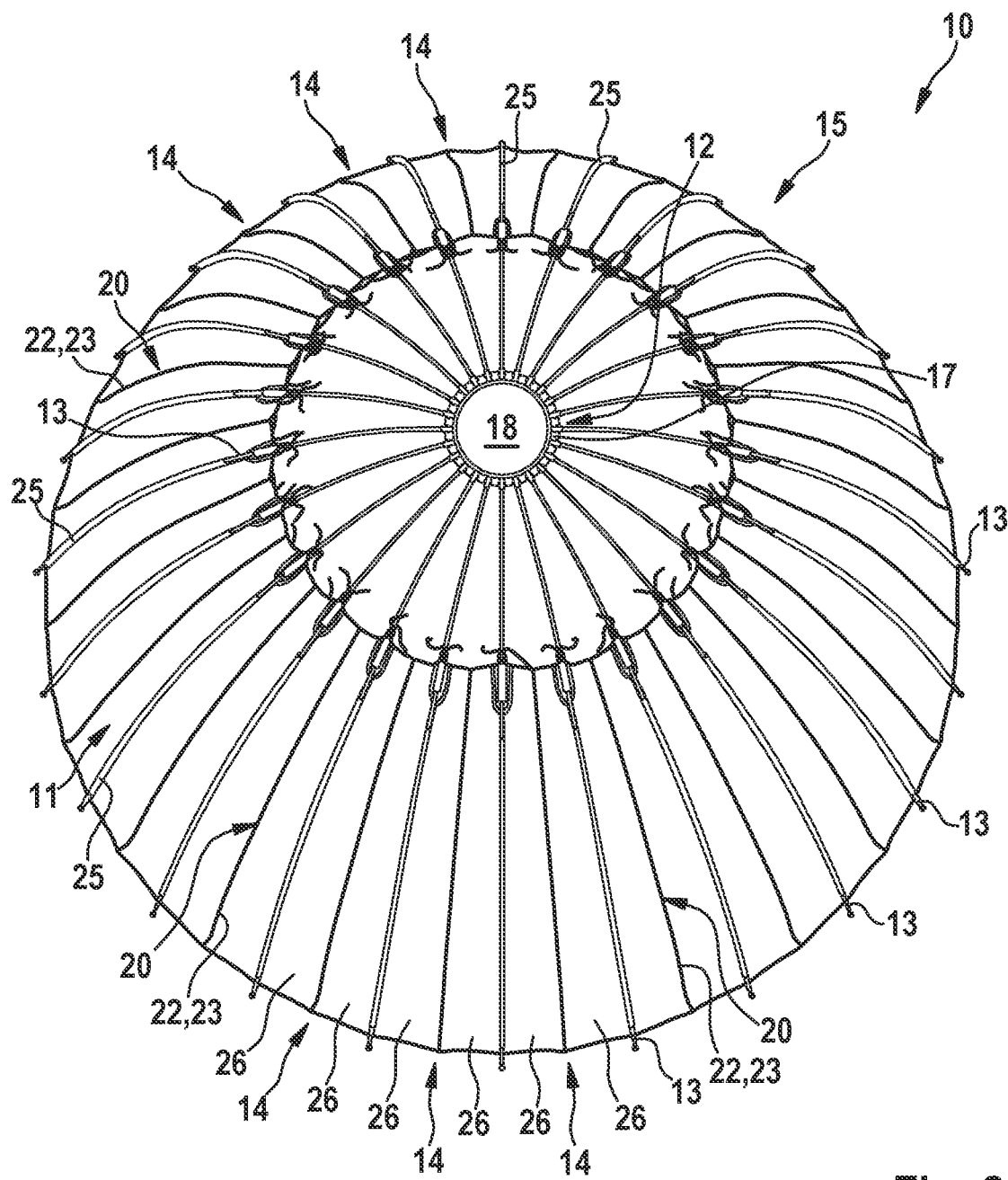
FIG. 2 shows the reflector umbrella according to FIG. 1 with inserted carrier element viewed from the rear.
Figure 3:
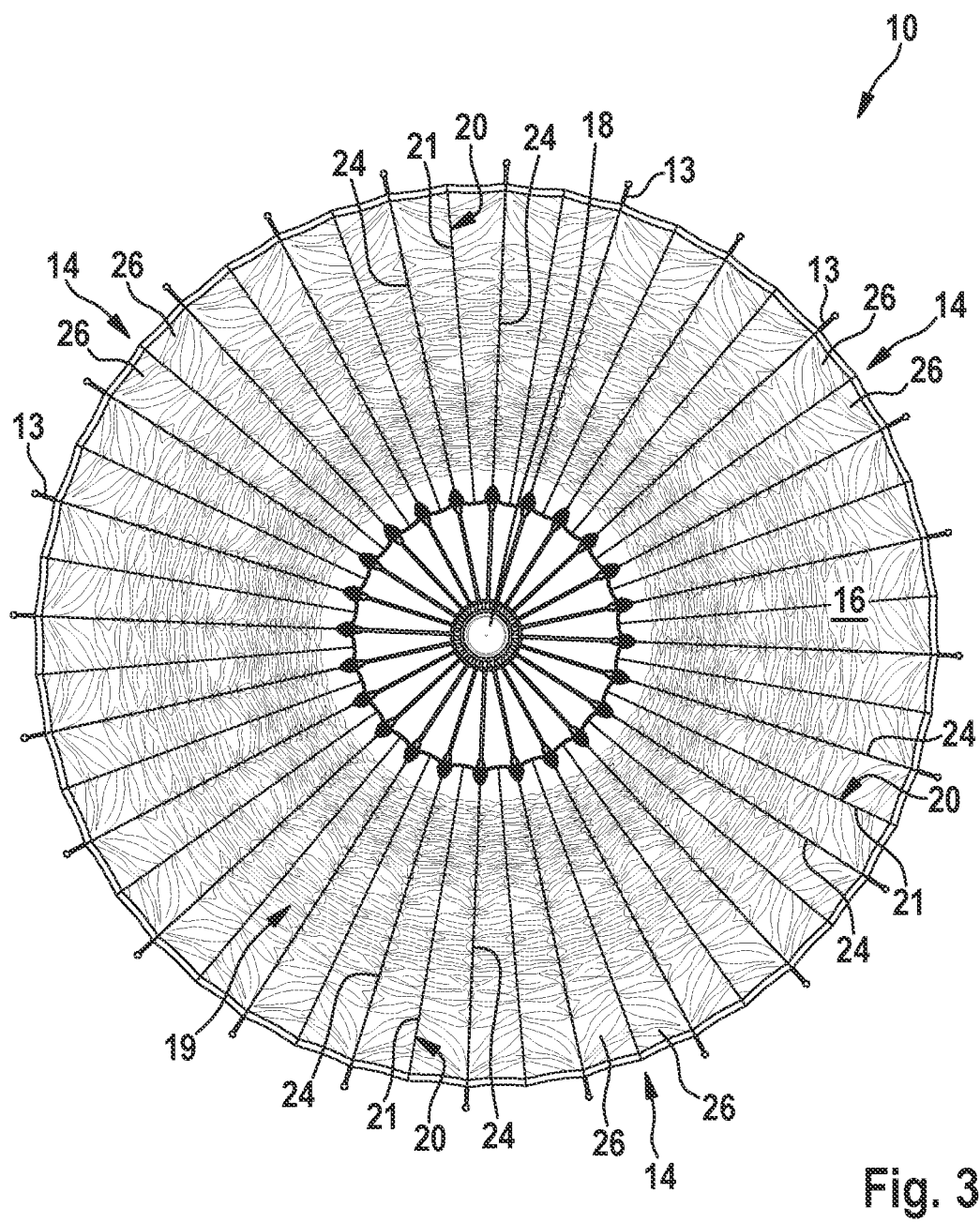
FIG. 3 shows the reflector umbrella according to FIG. 1 viewed from the front looking into the light exit opening.
Figure 4:
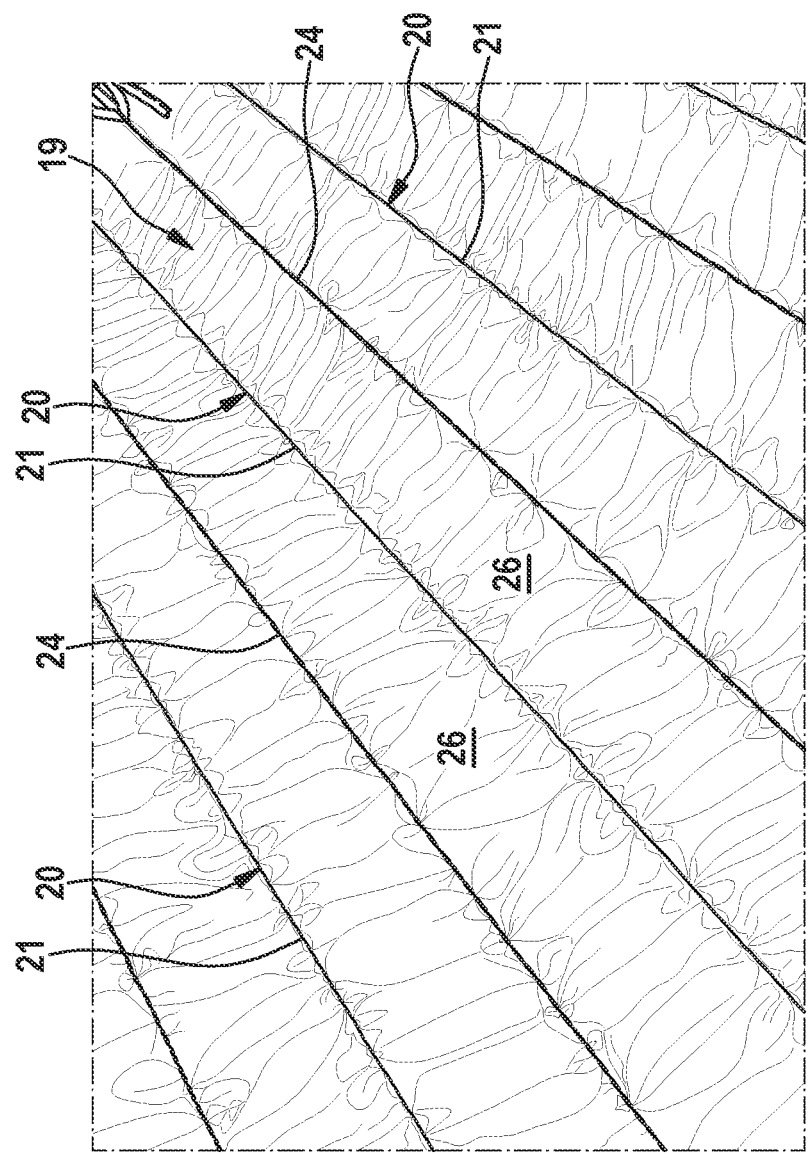
FIG. 4 shows an enlarged section of the reflecting surface of the reflector umbrella according to FIG. 1.
Figure 5:
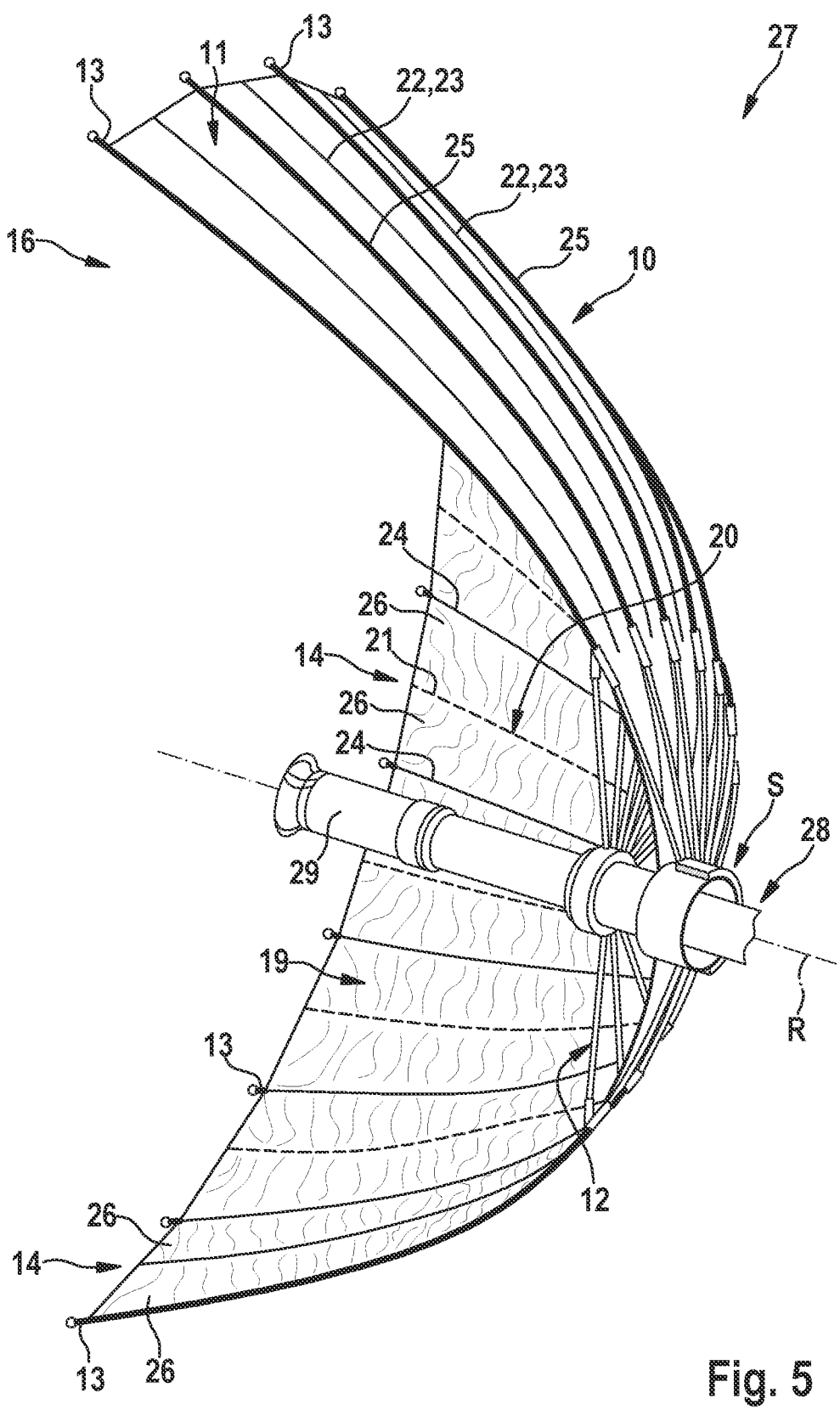
FIG. 5 shows a reflector assembly with a reflector umbrella (in partial section) in perspective view.

In the exemplary embodiment shown in FIGS. 1 to 5, all umbrella segments 14 are uniformly gathered. Particularly preferably, each umbrella segment 14 lying between two tensioning spokes 13 is designed to be gathered over essentially the entire surface. Optionally and preferably, the reflective surface 19 around the through-hole 18 is free from gathering. FIGS. 2 and 3 show particularly clearly that the gathering ends at a distance from the vertex S. In other embodiments, only individual umbrella segments 14 may be fully or partially gathered.

As already mentioned, the gathering of the reflective surface 19 can be formed without additional means. Preferably, however, means 20 for gathering the reflective element 11 are associated with the reflective element 11 or with the or each umbrella segment 14 having a gathering. The gathering means 20 may be clasps, clips, tensioning rubbers, tensioning threads or similar. Particularly preferably and as shown in the drawing, seams 21 form the gathering means 20. The seams 21 may be applied to the reflective element 11. However, the seams 21 can also be formed by cutting open the reflective element 11 and sewing the separated edges together. In the Figures, a continuous seam 21 is formed in each umbrella segment 14. This seam 21 is evenly spaced from the tensioning spokes 13 and thus runs centrally between the tensioning spokes 13. In other embodiments, the seams 21 may also be interrupted and/or have different orientations and/or occupy different positions.

The seams 21 themselves may form the means 20 for gathering the reflective element 11. Particularly preferably, a hem pocket 22 is formed in the area of each seam 21, into which at least one gathering spoke is 23 inserted. The hem pocket 22 preferably runs along the seam 21 or may even form it. Alternatively, the hem pockets 22 may also follow a different path to the seam 21. The hem pockets 22 may be completely closed. Preferably, however, the hem pockets 22 have at least one opening through which the gathering spoke 23 can be inserted.

The or each gathering spoke 23 is made of a flexible material, preferably a glass fibre reinforced plastic. The preferably rod-shaped gathering spokes 23 usually have a round cross-section and are provided with a smooth surface. Optionally, at least portions of each gathering spoke 23 have a textured surface, for example in order to form fine barbs or similar, which can be and are engaged with the material of the hem pocket 22. The cross-section of the gathering spokes 23 may vary and have, for example, a rectangular, oval or other shape.

The reflective element 11 itself preferably consists of a one-piece blank. The umbrella segments 14 are preferably divided or subdivided by seams 24. The outer tension spokes 13 are at least partially led through hem pockets 25 running along the seams 24. The seams 24 may also be formed by the hem pockets 25. The hem pockets 25 preferably have an opening for inserting the tensioning spokes 13.

In the specific and particularly preferred embodiment according to the drawing, the supporting and tensioning structure 12 comprises twenty-four tensioning spokes 13 which are evenly 14 distributed over the expanse of the opened reflector umbrella 10 to form twenty-four umbrella segments. The twenty-four umbrella segments 14 are divided by seams 21 forming gathering means, so as to create forty-eight equal umbrella sub-segments 26. The number of tensioning spokes 13 and thus of umbrella segments 14 can vary. The number of tensioning spokes 13 can ultimately also differ from the number of umbrella segments 14. The tensioning spokes 13 can also be irregularly distributed over the expanse.

The cloth-like reflective element 11 consists of a carrier material onto which an aluminium vapour-coated plastic film is applied on an inner side forming the reflective surface 19. The carrier material can be formed of one or more layers. The structure of the carrier material can vary, as can the formation of the reflective surface 19.

The previously described reflector umbrella 10 can be used as an individual component. Preferably, however, the reflector umbrella 10 is part of a reflector assembly 27 comprising a reflector umbrella 10 and a carrier element 28 with at least one light source 29. The reflector umbrella 10 according to the invention is designed and configured as disclosed herein. The carrier element 28 is guided through the through-opening 18 so that the reflector umbrella 10 sits on the carrier element 28.

The invention claimed is:

1. A foldable reflector umbrella, comprising:
   a flexible, cloth-like reflective element; and
   an outer supporting and tensioning structure composed of
      a plurality of tensioning spokes distributed over an expanse of the reflective element and divide the reflective element into a number of umbrella segments corresponding substantially to a number of the plurality of tensioning spokes;

wherein:

with the reflector umbrella in the opened state, the reflective element consisting of the number of umbrella segments forms a substantially rotationally symmetrical body with a light exit opening;

each umbrella segment has at least one seam between the tensioning spokes of each umbrella segment;

a hem pocket is formed along each seam, into which at least one gathering spoke is inserted; and each gathering spoke at least partially gathers the cloth-like reflective element in the opened state so as to form an uneven reflection surface.

2. The foldable reflector umbrella according to claim 1, wherein the plurality of tensioning spokes are distributed evenly of the expanse of the reflective element.

3. The foldable reflector umbrella according to claim 1, wherein at least some of the umbrella segments are at least partially gathered.

4. The foldable reflector umbrella according to claim 1, wherein each umbrella segment lying between two of the tensioning spokes is designed to be gathered over essentially an entire surface of the respective segment.

5. The foldable reflector umbrella according to claim 1, further comprising staples, clasps, tensioning rubbers, tensioning threads, or any combination thereof for gathering the reflective element associated with each umbrella segment.

6. The foldable reflector umbrella according to claim 1, wherein the at least one seam in each umbrella segment runs centrally between the respective tensioning spokes.

7. The foldable reflector umbrella according to claim 1, wherein each gathering spoke is made of a flexible material.

8. The foldable reflector umbrella according to claim 7, wherein the flexible material is a glass fibre reinforced plastic.

9. The foldable reflector umbrella according to claim 7, wherein at least portions of each gathering spoke have a textured surface.

10. The foldable reflector umbrella according to claim 1, wherein the reflective element consists of a one-piece blank and the tensioning spokes are at least partially led through outward-lying hem pockets running along the seams.

11. The foldable reflector umbrella according to claim 1, wherein the plurality of tensioning spokes of the supporting and tensioning structure comprises twenty-four tensioning spokes which are evenly distributed over the expanse of the opened reflector umbrella to form twenty-four umbrella segments.

12. The foldable reflector umbrella according to claim 11, wherein the twenty-four umbrella segments are divided by the seams so as to create forty-eight equal umbrella sub-segments.

13. The foldable reflector umbrella according to claim 1, wherein the cloth-like reflective element consists of a carrier material onto which an aluminium vapour-coated plastic film is applied on an inner side forming a reflective surface.

14. A reflector assembly comprising:

a reflector umbrella according to claim 1; and a carrier element with at least one light source.

* * * * *